United States Patent
Diehn et al.

(10) Patent No.: US 10,334,897 B2
(45) Date of Patent: Jul. 2, 2019

(54) QUICK-DRYING, TACKY POLYMER FILM COMPOSITIONS AND METHODS OF USE

(71) Applicant: University of Maryland, Office of Technology Commercialization, College Park, MD (US)

(72) Inventors: Kevin Diehn, Towson, MD (US); Chandamany Arya, Ellicott City, MD (US); Karl Engel, Leonardtown, MD (US); Matthew Furstenburg, Whitehouse Station, NJ (US); Srinivasa R. Raghavan, Columbia, MD (US)

(73) Assignee: University of Maryland, College Park, College Park, MD (US)

(*) Notice: Subject to any disclaimer, the term of this patent is extended or adjusted under 35 U.S.C. 154(b) by 67 days.

(21) Appl. No.: 14/552,535

(22) Filed: Nov. 25, 2014

(65) Prior Publication Data

US 2015/0147468 A1    May 28, 2015

Related U.S. Application Data

(60) Provisional application No. 61/908,530, filed on Nov. 25, 2013.

(51) Int. Cl.
*A41D 19/015* (2006.01)
*C09D 105/08* (2006.01)
*C09D 105/04* (2006.01)

(52) U.S. Cl.
CPC ..... *A41D 19/01558* (2013.01); *C09D 105/04* (2013.01); *C09D 105/08* (2013.01); *A41D 2400/80* (2013.01); *A41D 2500/54* (2013.01)

(58) Field of Classification Search
CPC .......... C08L 5/08; C08L 31/04; C08K 5/053; C08K 5/09; A41D 19/01558; A41D 2500/54; A41D 2400/80; C09D 105/08; C09D 105/04; C09D 131/04
See application file for complete search history.

(56) References Cited

U.S. PATENT DOCUMENTS

| 4,572,906 | A | * | 2/1986 | Sparkes | ............... | A61L 26/0052 106/135.1 |
| 4,645,757 | A | * | 2/1987 | Hjerten | ................... | A61K 9/146 424/489 |
| 4,920,158 | A | * | 4/1990 | Murray | ............... | A61L 26/0052 523/111 |
| 5,024,701 | A | | 6/1991 | Desmarais | | |
| 5,700,478 | A | | 12/1997 | Biegajski et al. | | |

(Continued)

OTHER PUBLICATIONS

Khan, "Mechanical, Bioadhesive Strength and Biological Evaluations of Chitosan films for Wound Dressing" J Pharm. Sci., (2000).*

(Continued)

*Primary Examiner* — Robert S Walters, Jr.
(74) *Attorney, Agent, or Firm* — Whiteford, Taylor & Preston, LLP; Peter J. Davis

(57) ABSTRACT

A formulation for coating surfaces, for example gloves, with a tacky film comprises a hydrophobically modified biopolymer, where the hydrophobic modifications of the biopolymer correspond to between 1 and 90% of available functional groups, a plasticizer, and a volatile solvent. The formulation quickly dries into a tacky film that provides an enhanced friction of the surface.

7 Claims, 1 Drawing Sheet

| | Worn Glove (No Coating) Trial 1 | Worn Glove (No Coating) Trial 2 | Bio-Polymer Single Coating Trial 1 | Bio-Polymer Single Coating Trial 2 | Bio-polymer Double Coating Trial 1 | Bio-polymer Double Coating Trial 2 | Bio-polymer Triple Coating Trial 1 | Bio-polymer Triple Coating Trial 2 |
|---|---|---|---|---|---|---|---|---|
| Run 1 | 55 | 46 | 76 | 67 | 76 | 77 | 81 | 82 |
| Run 2 | 57 | 48 | 77 | 68 | 81 | 84 | 80 | 84 |
| Run 3 | 55 | 47 | 75 | 69 | 80 | 78 | 85 | 85 |
| Run 4 | 54 | 44 | 75 | 68 | 79 | 78 | 82 | 83 |
| Run 5 | 60 | 52 | 73 | 69 | 78 | 79 | 83 | 83 |
| Run 6 | 59 | 49 | 78 | 69 | 82 | 78 | 82 | 80 |
| Average Mass (g) | 56.7 | 47.7 | 75.7 | 68.3 | 79.3 | 79.0 | 82.2 | 82.8 |
| Standard Deviation (g) | 2.4 | 2.7 | 1.8 | 0.8 | 2.2 | 2.5 | 1.7 | 1.7 |

(56) References Cited

U.S. PATENT DOCUMENTS

| | | | |
|---|---|---|---|
| 2004/0157758 A1* | 8/2004 | Adickes | C03C 17/3405 |
| | | | 510/180 |
| 2005/0137272 A1 | 6/2005 | Gaserod et al. | |
| 2006/0185847 A1* | 8/2006 | Saini | C09K 8/68 |
| | | | 166/279 |
| 2008/0053157 A1* | 3/2008 | Golding | A41D 19/015 |
| | | | 66/174 |
| 2009/0022770 A1 | 1/2009 | Anderson | |
| 2010/0031411 A1 | 2/2010 | Andrews | |
| 2010/0048508 A1* | 2/2010 | Ben-Shalom | A61K 9/1617 |
| | | | 514/55 |
| 2010/0087851 A1* | 4/2010 | Jones | A61K 38/012 |
| | | | 606/213 |
| 2010/0325777 A1* | 12/2010 | Radhakrishnan | |
| | | | A41D 19/01558 |
| | | | 2/168 |
| 2012/0053261 A1* | 3/2012 | Pravata | A61L 15/58 |
| | | | 523/118 |

OTHER PUBLICATIONS

Zhang et al., "Chitosan Nanofibers from an Easily Electrospinnable UHMWPEO-Doped Chitosan Solution System", Biomacromolecules, vol. 9, (2008), pp. 136-141.*
International Search Report issued in corresponding International Application No. PCT/US14/67215 dated Mar. 11, 2015.

\* cited by examiner

| | Worn Glove (No Coating) Trial 1 | Worn Glove (No Coating) Trial 2 | Bio-Polymer Single Coating Trial 1 | Bio-Polymer Single Coating Trial 2 | Bio-polymer Double Coating Trial 1 | Bio-polymer Double Coating Trial 2 | Bio-polymer Triple Coating Trial 1 | Bio-polymer Triple Coating Trial 2 |
|---|---|---|---|---|---|---|---|---|
| Run 1 | 55 | 46 | 76 | 67 | 76 | 77 | 81 | 82 |
| Run 2 | 57 | 48 | 77 | 68 | 81 | 84 | 80 | 84 |
| Run 3 | 55 | 47 | 75 | 69 | 80 | 78 | 85 | 85 |
| Run 4 | 54 | 44 | 75 | 68 | 79 | 78 | 82 | 83 |
| Run 5 | 60 | 52 | 73 | 69 | 78 | 79 | 83 | 83 |
| Run 6 | 59 | 49 | 78 | 69 | 82 | 78 | 82 | 80 |
| Average Mass (g) | 56.7 | 47.7 | 75.7 | 68.3 | 79.3 | 79.0 | 82.2 | 82.8 |
| Standard Deviation (g) | 2.4 | 2.7 | 1.8 | 0.8 | 2.2 | 2.5 | 1.7 | 1.7 |

QUICK-DRYING, TACKY POLYMER FILM COMPOSITIONS AND METHODS OF USE

CROSS-REFERENCE TO RELATED APPLICATIONS

The present application claims priority under 35 U.S.C. § 119 to the U.S. Provisional Application Ser. No. 61/908,530, filed on Nov. 25, 2013, which is incorporated herein by reference in its entirety.

BACKGROUND OF THE INVENTION

Field of the Invention

This invention relates to the field of biopolymers and biopolymer formulations.

Description of the Background

Athletes in many disciplines rely on gloves to protect their hands but also for providing a better grip. Sports gloves utilize tacky surfaces to allow the athlete to have a better grip. Football players, for example, rely on tacky gloves for better grip of the football. Similarly, goal keepers in soccer teams rely on tacky gloves to have a better grip on the soccer ball, when is most necessary during a game. Other athletes may use the tacky gloves to grip their equipment, e.g., baseball bats, hockey sticks. Existing tacky gloves are expensive and not very durable.

Today, football players of all ages from child leagues to professional leagues use gloves with tacky polymer coatings to enhance their ability to catch the football. These gloves are not only costly, but lack durability—the glove's tack may become reduced after a few days of practice. This reduction in grip occurs due to both the glove collecting dirt, but also due to the coating wearing off of the glove. However, despite the drawbacks, the gloves are still widely used at every level of football.

SUMMARY OF THE INVENTION

It is an object of the present application to disclose a formulation for a solution that dries to form a tacky film that can be used on athletic gloves and other surfaces for which increased friction is desired. In one preferred embodiment, the formulation is to be applied to athletic gloves to provide improved grip. The formulation comprises a hydrophobically modified biopolymer, where between 1 and 90% of available functional groups in the biopolymer's backbone have been covalently bound to hydrophobic moieties, and a volatile solvent.

In preferred embodiments, the biopolymer is selected from chitosans, alginates, and cellulosics. In some instances, the formulation also includes a weak acid to assist in solubilizing the biopolymer, such as is the case with chitosans. If the weak acid being utilized is non-volatile it may also serve as a plasticizer. In yet further embodiments, the formulation may contain enhancers that provide additional properties to the dried tacky composition once it dries, such as shine, opacity, and color.

It is another object of this application to disclose a tacky film comprising a hydrophobically modified biopolymer. It is yet another object to provide a method for restoring and enhancing the grip of a used athletic glove by applying the formulation described above and allowing it to dry on the glove. It is another object to provide a method for increasing the tackiness of a surface by application of the formulation of hydrophobically modified biopolymer to the surface.

One additional object of the present application is to disclose kits for the application of the solution of hydrophobically modified biopolymers to a surface. Still other aspects, features, and advantages are readily apparent from the following detailed description illustrating a number of particular embodiments and implementations, including the best mode contemplated for carrying out the invention. The invention is also capable of other and different embodiments, and its several details can be modified in various obvious respects, all without departing from the spirit and scope of the invention.

BRIEF DESCRIPTION OF THE DRAWINGS

FIG. 1 is a table comparing mass measurements from the worn-down glove with no coating and a single, double, or triple coating of the film.

DETAILED DESCRIPTION

The invention summarized above may be better understood by referring to the following description. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

A quick-drying polymer coating formulation made from a hydrophobically modified biopolymer, in an example chitosan, enhances the tack of a surface. For example, when applied to football gloves the tack of the football glove is restored. In one example, after applying the solution to a glove and drying the coating, a thin, transparent, shiny, and tacky polymer coating to the glove is formed that enhances the grip of the glove wearer to improve their capability to catch a football. As utilized herein the term "tack" and "tacky" refers to a non-slip or low-slip surface that prevents other surfaces from sliding along the coating applied to the surface. Unmodified chitosan does not form a tacky film. Surprisingly, the covalent modification of chitosan that adds hydrophobic substituents to the chitosan molecule increases its tackiness.

A formulation for a tacky biopolymer film comprises a hydrophobically modified biopolymer, a weak acid, and a solvent. When the formulation is applied to a surface, such as an athletic glove, and allowed to dry, a tacky hydrophobically modified biopolymer film binds to the surface. In one exemplary embodiment, the formulation is applied to the palm and fingers of a football glove. Upon drying, the tacky hydrophobically modified film remains providing added grip to the surface of the glove.

In another exemplary embodiment, the quick drying polymer coating is comprised of four components: (1) a hydrophobically-modified polymer, for example either hydrophobically-modified gelatin, hydrophobically-modified alginate, or hydrophobically-modified chitosan (hmCS) comprising between 1 and 15 percent by mass of the dried film, preferably between 5-10 percent by mass of the final film, (2) a plasticizer, for example ethylene glycol, glycerol or other small, non-volatile hydroxyl-containing molecule, between 50-99 percent by mass of the dried film, (3) an enhancer, namely a non-tacky film forming polymer, for example poly vinyl acetate, poly vinyl alcohol, or partially hydrolyzed polyvinyl acetate with a hydrolysis percentage between 0 and 100 percent of the acetyl groups, between 0 and 10 percent by mass of the dried film, and (4) a solvent mixture of volatile components comprising mainly of at least 3 grams of ethanol per 1 gram of water, and a volatile weak acid.

As utilized in this application, the term biopolymer refers to one or more polysaccharides, including but not limited to cellulosics, chitosans and alginates, all of which are abundant, natural biopolymers. In a preferred embodiment, the polymer that forms the backbone of this reactive matrix is of synthetic or natural origin, including for example, water-soluble polysaccharides and water-soluble polypeptides.

The form of the natural polymers used may vary to include standard states, derivatives and other various formulations. For example, the cellulosics may include without limitation, hydroxyethyl cellulose, hydroxypropyl cellulose, methyl cellulose, hydroxypropyl methyl cellulose, and/or hydroethyl methyl cellulose. Chitosans may include without limitation, the following chitosan salts: chitosan lactate, chitosan salicylate, chitosan pyrrolidone carboxylate, chitosan itaconate, chitosan niacinate, chitosan formate, chitosan acetate, chitosan gallate, chitosan glutamate, chitosan maleate, chitosan aspartate, chitosan glycolate and quaternary amine substituted chitosan and salts thereof. Alginates may include without limitation, sodium alginate, potassium alginate, magnesium alginate, calcium alginate, and/or aluminum alginate. It is to be understood that various other forms of any of these natural polysaccharides that provide the proper functional capabilities may be employed without departing from the scope and spirit of the present application.

Hydrophobically modified biopolymers refer to those biopolymers described above that have been modified by covalently attaching a hydrophobic residue to available functional groups within the biopolymer's backbone. An example of such modifications can be found in United States Application Publication Serial Numbers US2009/0062849A1 and US2008/0254104, both of which are incorporated herein by reference in their entireties. Each biopolymer is composed of multiple repeating monomeric units. Each unit may contain functional groups. Such functional groups are parts of the monomeric unit that is capable of reacting with other compounds. For example, chitosan has available amines and carboxylic functional groups, which may be used for covalent attachment of other compounds without disrupting the basic structure of each monomeric unit or the bonds between monomeric units.

In this case, level of hydrophobic modification refers to the percent of available functional groups changed from a hydrophilic moiety, in the case of chitosan an amine, to a hydrophobic tail. In some examples, the hydrophobic moiety consists of a fatty acid tails of 12-18 carbons in length. In yet a further preferred embodiment, the hydrocarbon tails will be 8 to 18 carbon residues in length. As described in this application, preferred hydrophobically modified biopolymers comprise biopolymers in which 1% to 90% of available functional groups, e.g., amines in Chitosan, are modified by covalent attachment of hydrophobic moieties. In some preferred embodiments, the hydrophobic modifications range between 2.5% and 15%. This percentage is defined by the number of hydrophobic units per repeating monomer unit, e.g. 1% to 90% modification would correspond to 1-90 units of hydrophobic substituents per 100 monomer units of the repeating biopolymer, e.g., Chitosan.

As the level of modification of chitosan increases, the modified chitosan's tackiness increases. It is further contemplated that the hydrophobic substitutions may include alkanes, alkenes, and cyclic hydrocarbon molecules.

Solubility in high concentrations of solvent, such as ethanol, assists in ensuring a quick drying time on the surface where the solution is applied, such as an athletic glove. The hydrophobically modified biopolymer, for example chitosan, is an altered from of the original polymer which is surprisingly more soluble in alcohol than the unmodified biopolymer. In the present formulation, a volatile solvent is preferred. A volatile solvent is defined for the purposes of this application as compound with a vapor pressure greater than 25 mm hg at room temperature (defined as 25 degrees C.) and standard sea-level atmospheric pressure (760 mm hg). Water, at standard atmospheric temp and pressure (25 degrees C.; 760 mm hg) has a vapor pressure of 23.88 mm hg and thus would not be considered a volatile solvent under the above dependent claim definition; however, water can be combined with a volatile solvent, as shown in the examples in this application.

One aspect of the composition described herein is the surprisingly altered solubility of the hydrophobically modified polymer. For example, unmodified chitosan and chitosan at lower levels of hydrophobic modification, such as 1% or less, are soluble in up to approximately 50% ethanol and 50% water with a substantial amount of acid, for example acetic acid or lactic acid in concentrations up to 1.75 M (based upon the water content). Such unmodified chitosan and modified chitosan with low levels of modification require a water content of at least 50%, such compounds are less soluble in solutions with lower water content. It is surprising that decreasing the number of hydrophilic functional groups in chitosan increases its solubility in alcoholic solvents which also have hydrophilic functional groups available for hydrogen bonding. In the present invention, which utilizes higher levels of modification (e.g., 10%), however, the polymer is still soluble in solutions up to 80% ethanol with 20% water including high concentration of acetic acid or lactic acid, such as 1.75 M. This change in solubility enables higher levels of volatile solvent in the solution and enhances the drying time of the tacky coat.

As the degree of modification of the polymer increases, such as 20% and 50%, it is soluble in even higher levels of volatile solvent (such as 90% ethanol and 10% water) and thereby further enhances the drying time of the film. As discussed above, the prior art describes unmodified chitosan in a solvent containing at least 50% water and it is well-known that such unmodified chitosan is insoluble in solutions with less water content. The surprising result that attachment of hydrophobic moieties to the biopolymer increase solubility of chitosan, which affect solubility of the biopolymer, provides a significant advantage over the prior art as homogenous dissolved biopolymer compositions with significantly lower water content (i.e. higher volatile solvent content) can be generated that dry at a much faster rate than previously disclosed formulations.

The unique change in solubility of the biopolymer enables use of a non-toxic volatile solvent, such as ethanol, that improves the safety for the end user of the invention relative to other polymer products, such as paints and glues, which typically contain relatively toxic solvents. The following table reports the change in solubility with hm-modification of chitosan:

TABLE 1

Solubility of 10% modified hm-chitosan in
Various Mixtures of Alcohol and Acidic H$_2$O.

| Solvent Composition (% Alcohol, % Acidic H$_2$O, Acetic Acid Molarity) | Alcohol Type | Solubility | Comment |
|---|---|---|---|
| 70, 30, 0.4M | Methanol | Soluble | |
| 70, 30, 0.8M | Methanol | Soluble | |
| 75, 25, 0.4M | Methanol | Soluble | |
| 75, 25, 0.8M | Methanol | Soluble | |
| 80, 20, 0.4M | Methanol | Partially Soluble | Not very dissolved, large insoluble chunks |
| 80, 20, 0.8M | Methanol | Partially Soluble | Very close to dissolving, one small chunk |
| 80, 20, 1.75M | Methanol | Soluble | |
| 70, 30, 0.4M | Ethanol | Soluble | |
| 70, 30, 0.8M | Ethanol | Soluble | |
| 75, 25, 0.4M | Ethanol | Partially Soluble | Very close to dissolving, small chunks |
| 75, 25, 0.8M | Ethanol | Partially Soluble | |
| 80, 20, 0.4M | Ethanol | Insoluble | |
| 80, 20, 0.8M | Ethanol | Partially Soluble | Not very dissolved |
| 80, 20, 1.75M | Ethanol | Soluble | |

Note that the limit of solubility of unmodified chitosan is at 50% Methanol, 50% 0.8M Acetic Acid in H$_2$O The solvent can be any small molecule alcohol with high volatility. In a preferred embodiment, the solvent comprises a small molecule alcohol and water, in a concentration of between 60 and 90% weight by volume of the small molecule and 10 and 40 percent weight by volume of water. In yet a further preferred embodiment, the small molecule alcohol is selected from the group consisting of ethanol, methanol, and iso-propyl alcohol.

The use of a weak acid assists in solubilizing the hydrophobically modified biopolymer, such as hydrophobically modified chitosan. Weak acids may not be necessary with other biopolymers. The type of weak acid selected for the solution may include acetic acid, lactic acid, formic acid, nitrous acid, gluconic acid, citric acid, malic acid, and succinic acid. Other considerations that can be used in selecting the type of acid include the impact on the user. For example, acetic acid has a stronger smell than lactic acid. Thus, using lactic acid can reduce the reaction to the solution for a particular user. Other similar considerations are taken into account when selecting a type of use.

The solution quickly dries after application to a particular surface. The speed at which the solution dries varies depending on the volume applied to the surface and the volatility of the solvent used. When 0.2 mL of the solution is applied to athletic gloves, for example, it dries in approximately 15 to 30 seconds. If 2 mL of the solution is applied, it will dry in several minutes. When a significant volume of the solution is applied, external drying assistance may be required. In one exemplary embodiment, dry air from a hair drier can be utilized to dry larger volumes of the solution.

In yet another exemplary embodiment, a plasticizer may be added to the solution. A plasticizer is a molecule that interferes with hydrogen bonds that might form between hydrophobically modified biopolymer molecules, e.g., chitosan polymers, during drying (i.e., disrupts crystallization). By interfering hydrogen bonds between the biopolymer molecules, the plasticizer softens the film and increases tack. This increase in tack will only occur up to a particular plasticizer concentration, above which the plasticizer will no longer remain miscible in the system and/or cause the polymer film to become so soft that it never dries to a solid. Note that without the plasticizer, the tackiness of the film will be reduced as the film dries out over the course of hours to days. With the plasticizer present, the film remains tacky over the course of several days. Any non-volatile, hydrogen bonding small molecule that mixes in with the system is an effective plasticizer. There are a wide variety of sugar alcohols that have similar properties to glycerol and can be used as plasticizers, including, methanol, ethylene glycol, erythritol, threitol, arabitol, xylitol, ribitol, sorbitol, mannitol, galactitol, fucitols, iditols, inositol, volemitol, isomalt, malitol, lactitol, maltitol, maltotetraitol, polyglycitol, and other similar molecules.

Surprisingly, lactic acid can also function as a plasticizer. Thus, a weak acid can serve a similar role as the plasticizer. In order for a weak acid to function as a plasticizer, however, it must be non-volatile because non-volatile weak acids will remain in the final film in significant amounts. Examples of non-volatile weak acids that can function as plasticizers include low-volatility carboxylic acids such as gluconic acid, citric acid, malic acid, and succinic acid.

In yet a further exemplary embodiment, an enhancer may be utilized. An enhancer is a transparent shiny film that forms on a surface upon evaporation of the solvent. In one example, as described below, the enhancer is polyvinyl acetate. The polyvinyl acetate used in this composition provides additional shine and gloss back into the gloves to aesthetically look like a new glove again. The enhancers can be selected from polymers that are soluble in alcohol and can act as good film forming polymers. Examples of such polymers include polyvinyl acetate, celluloses, alkyl celluloses, hydroxyalkyl celluloses, zein, polylactic acid, alkyl acrylates, hydroxyalkyl acrylates, polyvinyl alcohol, and partially hydrolyzed polyvinyl acetate. Another consideration in selecting an enhancer is the enhancer's ability to remain in solution with the biopolymer. For example, many polymers could cause chitosan to precipitate out of the mixture.

All components of the above mixture are soluble in one phase at the ratios described, so that it can be applied uniformly to surfaces to restore a consistent tackiness and shine to the surface. This one phase composition would not be achievable without hydrophobically modifying the biopolymer, for example the same ratios of unmodified chitosan in the above compositions would not be soluble, and the two phase solution would not form a tacky coating upon drying.

In yet a further embodiment, the present application provides a tacky biopolymer film comprising a dried tacky hydrophobically modified biopolymer. A dry tacky hydrophobically modified biopolymer is a film that has been manufactured by drying the solution described above. The dried tacky hydrophobically modified biopolymer is different from other hydrophobically modified chitosan films in that such gels and solutions are formed using aqueous acidic solutions in water as opposed to small molecule alcohols, as is the case in the solution described above.

In a further embodiment, a method of application of the solution described above allows an athlete or other user to use the solution described above. Other polymer film forming products are of such low viscosity that they do not remain in the place where they are applied and are difficult to contain within a desired area. Such film forming products also require longer drying times on the order of one day. The solution described in this application is a higher viscosity solution that can be rubbed directly to a surface and can dry in seconds to minutes with the aid of an air convection source, such as a hair dryer or other fan. Depending on the amount of solution applied to a surface, the drying time may change. For example, as described above, if 0.2 mL of the solution are used, the solvent will evaporate within 15 to 30 seconds and the film will be dried. If 2 mL are used, on the other hand, assistance may be needed as described above to dry the film. If the convection source is heated, the drying time can be shorted to less than one minute for a single film. The solution can be delivered either by a pump bottle as seen in soap containers or in the form of a spray. Thus, the solution may be conveniently applied directly on-site where it will be used to form a quickly drying tacky coating, for example in the locker room or on the sideline of a football game or other sporting event or on a construction site for workers handling tools.

In yet a further embodiment, a method of using a tacky biopolymer film comprises a number of steps. In a first step, a tacky biopolymer film solution that comprises a hydrophobically modified biopolymer and a solvent to a surface, such as an athletic glove. The solution may also contain a weak acid, a plasticizer, or both. The solution may be applied to the palm of the glove and the digit side of the fingers of the glove to assist in improving the glove's grip. In a further step, the tacky biopolymer film solution is allowed to dry. In some embodiments the volume of solution applied to the surface ranges between 0.2 mL and 2 mL. The solution is allowed to dry for 15 seconds to 2 minutes, preferably 15 to 30 seconds.

A method of manufacturing a tacky biopolymer film solution comprises dissolving a hydrophobically modified biopolymer in a solvent. A weak acid and a plasticizer or both, may also be added to the solution. The solvent concentration is between 60 and 90% weight by volume of the small molecule (e.g., alcohol) and 10 and 40% weight by volume water. When the weak acid is used, it is added to achieve a concentration of between 0.4 and 1.75M, preferably 1.75M.

EXAMPLES

To demonstrate the increase in tackiness provided by the solution described above, frictional tests were performed on worn-down football glove samples with no coating versus with a coating with the solution described in this application. The table below shows frictional tests performed by the use of an inclined plane frictional tester. To perform these tests, a rectangular sample is cut from the palm of a worn down pair of football gloves and the sample is adhered to a glass plate via acrylic glue. The mounted glove sample is placed face-down on top of a clean glass plate on an inclined plane. The top plate attached to a string, which runs through a pulley over the edge of a table. Precision masses were attached to the string to provide a consistent pulling force on the top glass plate. The mass at which the top plate first showed movement was then recorded before resetting the plates and weights and retesting the sample. Each sample was repeated six times and the glove was cleaned between samples. The experiment compared mass measurements from the worn-down glove with no coating and a single, double, or triple coating of the film. The data is shown in FIG. 1.

The frictional tests show a consistent increase in the friction of the glove. Note that all samples coated with the solution and having the tacky film showed a higher frictional coefficient than the uncoated glove (left most column). Additionally, it should be noted, as an additional surprising result, that the level of hydrophobic modification increased the tackiness of the final film—the hydrophobic modification was essential for providing increases in a tackiness of the film surface.

Several other formulations can also be used in accordance with different embodiments of the present invention as shown below:

Composition 1:

|  | Percentage by Weight |
| --- | --- |
| Hydrophobically Modified Chitosan | 1% |
| Poly Vinyl Acetate | 0.5% |
| Glycerol | 9% |
| Acetic or Lactic Acid | 1.5% |
| Ethanol | 66% |
| Water | 22% |
| Total | 100% |

Composition 2:

|  | Percentage by Weight |
| --- | --- |
| Hydrophobically Modified Chitosan | 1% |
| Poly Vinyl Acetate | 0.5% |
| Glycerol | 13% |
| Acetic or Lactic Acid | 1.5% |
| Ethanol | 63% |
| Water | 21% |
| Total | 100% |

Composition 3:

|  | Percentage by Weight |
| --- | --- |
| Hydrophobically Modified Chitosan | 1% |
| Poly Vinyl Acetate | 0.5% |
| Glycerol | 8.5% |
| Acetic or Lactic Acid | 1.5% |
| Methanol | 70% |
| Water | 18.5% |
| Total | 100% |

Composition 4:

|  | Percentage by Weight |
| --- | --- |
| Hydrophobically Modified Chitosan | 0.5% |
| Poly Vinyl Acetate | 0.5% |
| Glycerol | 9% |
| Acetic or Lactic Acid | 1.5% |
| Methanol | 70% |
| Water | 18.5% |
| Total | 100% |

Composition 5:

|  | Percentage by Weight |
| --- | --- |
| Hydrophobically Modified Chitosan | 1.5% |
| Poly Vinyl Acetate | 0.5% |
| Glycerol | 8% |
| Acetic or Lactic Acid | 1.5% |
| Methanol | 70% |
| Water | 18.5% |
| Total | 100% |

The tacky coating solution and coating described herein has numerous advantages. In the case of applying the coating to a football glove, the grip of the glove wearer along with their ability to catch a football is enhanced. The coating may be applied before the game or quickly during breaks, either on the sideline or in the locker room. The coating restores the shiny appearance of the surface of the glove to appear like a brand new glove. The film is biodegradable, namely, each component is readily degraded in nature. The solution is non-toxic, when compared to components used in paints, such as highly toxic volatile organic solvents and which are sometimes used to make the gloves look newer. It is contemplated that the solution can be applied to other athletic gloves, construction gloves, including gloves made from synthetic surfaces such as PVC, Silicone and Polyurethane. Also gloves made from leather and just any glove in general where additional grip may be an advantage.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A solution comprising:
   About 0.5% to about 1.5% by weight of a chitosan, in which about 2% to about 15% of available functional groups of the chitosan are covalently attached to hydrophobic moieties, about 8% to about 13% by weight of glycerol; about 1.5% by weight of acetic or lactic acid, about 60% to about 70% by weight of an alcohol, and about 18% to about 22% by weight of water.

2. The solution of claim 1, further comprising an enhancer selected from the group consisting of polyvinyl acetate, celluloses, alkyl celluloses, hydroxyalkyl celluloses, zein, polylactic acid, alkyl acrylates, hydroxyalkyl acrylates, polyvinyl alcohol, and partially hydrolyzed polyvinyl acetate.

3. The solution of claim 1, wherein the hydrophobic moiety comprises a hydrocarbon molecule of between 8 and 18 carbon atoms, selected from the group consisting of alkanes, alkenes, and cyclic hydrocarbon molecules.

4. A dry and tacky grip-enhancing coating for athletic gloves,
   which dry and tacky grip-enhancing coating is the dried product of a solution comprising: about 0.5% to about 1.5% by weight of a chitosan, in which about 2% to about 15% of available functional groups of the chitosan are covalently attached to hydrophobic moieties, about 8% to about 13% by weight of glycerol; about 1.5% by weight of acetic or lactic acid, about 60% to about 70% by weight of an alcohol, and about 18% to about 22% by weight of water.

5. A method of enhancing the grip of an athletic glove comprising:
   applying to a gripping surface of the athletic glove about 0.2 to about 2 ml of a solution comprising about 0.5% to about 1.5% by weight of a chitosan, in which about 2% to about 15% of available functional groups of the chitosan are covalently attached to hydrophobic moieties, about 8% to about 13% by weight of glycerol; about 1.5% by weight of acetic or lactic acid, about 60% to about 70% by weight of an alcohol, and about 18% to about 22% by weight of water and; allowing the solution to dry.

6. The method of claim 5 further comprising periodically reapplying the solution to the glove.

7. A method of restoring tack to a grip surface of an athletic glove, comprising:
   applying to said grip surface of the athletic glove about 0.2 to about 2 ml of a solution comprising about 0.5% to about 1.5% by weight of a chitosan, in which about 2% to about 15% of available functional groups of the chitosan are covalently attached to hydrophobic moieties, about 8% to about 13% by weight of glycerol; about 1.5% by weight of acetic or lactic acid, about 60% to about 70% by weight of an alcohol, and about 18% to about 22% by weight of water, and
   allowing the solution to dry.

* * * * *